United States Patent
Pylvas (10) Patent No.: US 10,209,834 B2
(45) Date of Patent: Feb. 19, 2019

(54) INTEGRATED SELF-CAPACITIVE TOUCH DISPLAY

(71) Applicant: MICROSOFT TECHNOLOGY LICENSING, LLC, Redmond, WA (US)

(72) Inventor: Pasi Pylvas, Ylöjärvi (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 90 days.

(21) Appl. No.: 14/504,160

(22) Filed: Oct. 1, 2014

(65) Prior Publication Data

US 2016/0098114 A1    Apr. 7, 2016

(51) Int. Cl.
*G06F 3/044*    (2006.01)
*G06F 3/041*    (2006.01)

(52) U.S. Cl.
CPC ............ *G06F 3/044* (2013.01); *G06F 3/0412* (2013.01); *G06F 3/0416* (2013.01)

(58) Field of Classification Search
CPC ............................... G06F 3/044; G06F 3/0412
See application file for complete search history.

(56) References Cited

U.S. PATENT DOCUMENTS

| | | | |
|---|---|---|---|
| 5,847,690 A | 12/1998 | Boie et al. | |
| 6,177,918 B1 | 1/2001 | Colgan et al. | |
| 8,217,913 B2 | 7/2012 | Hotelling et al. | |
| 8,654,083 B2 | 2/2014 | Hotelling et al. | |
| 8,730,179 B2 | 5/2014 | Rosenblatt et al. | |
| 9,250,735 B2 * | 2/2016 | Kim | G06F 3/0412 |
| 2010/0245308 A1 | 9/2010 | Takei | |
| 2010/0253638 A1 * | 10/2010 | Yousefpor | G06F 3/0416 345/173 |
| 2011/0128254 A1 | 6/2011 | Teranishi et al. | |
| 2012/0249476 A1 | 10/2012 | Schwartz et al. | |
| 2013/0194198 A1 * | 8/2013 | Guard | G06F 3/044 345/173 |
| 2013/0342479 A1 * | 12/2013 | Pyo | G09G 3/00 345/173 |

(Continued)

FOREIGN PATENT DOCUMENTS

| | | |
|---|---|---|
| CN | 103279245 A | 9/2013 |
| CN | 103926729 A | 7/2014 |

OTHER PUBLICATIONS

Decanne, Bart, "Trends in Capacitive Touch Panels", Published on: Feb. 7, 2013, Available at: http://electronicdesign.com/displays/trends-capacitive-touch-panels.

(Continued)

*Primary Examiner* — Kent Chang
*Assistant Examiner* — Scott Au (57) ABSTRACT

A display with integrated self-capacitance sensors comprises a sensor electrode and a guard layer in the display stack. Touch displays combine internally elements required for the display function and the touch sensing function. In an embodiment, the common voltage layer, VCOM layer, is used as the guard layer and another layer on top of the common voltage layer, for example a color filter layer, is used as the electrode array layer. The functionality of the common voltage layer is alternated between the touch sensing function and the display function. Either function may be used while the other function is disabled.

20 Claims, 6 Drawing Sheets

(56) References Cited

U.S. PATENT DOCUMENTS

| | | | |
|---|---|---|---|
| 2014/0022185 A1 | 1/2014 | Ribeiro et al. | |
| 2014/0111446 A1* | 4/2014 | Lee | G06F 3/0416 345/173 |
| 2014/0292700 A1* | 10/2014 | Mizuhashi | G06F 3/044 345/173 |
| 2015/0084912 A1* | 3/2015 | Seo | G06F 3/0412 345/174 |
| 2015/0130753 A1* | 5/2015 | Woo | G06F 3/044 345/174 |

OTHER PUBLICATIONS

Decanne, Bart, "Challenges of display integrated with touch", Aug. 1, 2014, Available at: http://m.eetasia.com/STATIC/PDF/201212/EEOL_2012DEC04_SENS_CTRL_TA_01.pdf?SOURCES=DOWNLOAD.

"International Search Report & Written Opinion Issued in PCT Application No. PCT/US2015/052768", dated Dec. 23, 2015, 12 Pages.

"Second Written Opinion Issued in PCT Application No. PCT/US2015/052768", dated Aug. 23, 2016, 8 Pages.

"International Preliminary Report on Patentability Issued in PCT Application No. PCT/US2015/052768", dated Feb. 15, 2017, 9 Pages.

* cited by examiner

INTEGRATED SELF-CAPACITIVE TOUCH DISPLAY

BACKGROUND

Displays with a capacitive touch function measure sensor capacitance changes. In self-capacitance touch displays, for example of a directional type, capacitive sensors are arranged in an array of electrodes that are distributed on a same level on the display stack, forming an electrode array layer. The capacitance change is detected between the electrode array layer and the surrounding environment, such as an ambient ground level. For example a finger in the vicinity of the sensor can be modelled as a ground level object. The parasitic capacitance between the electrode layer and a guard layer may be minimized by design. The guard layer may be driven to the same potential as electrodes, minimizing the parasitic capacitance coupling of the ground level to electrodes and further increasing the sensitivity of the electrode sensor array in detecting changes in the capacitance. The guard electrode may be a separate layer below the electrode array layer on the display stack. Each electrode on the electrode array may be measured separately by a dedicated charge amplifier or connections to a number of charge amplifiers can be multiplexed. The complex structure requires multiple layers on the display stack, thereby increasing the thickness of the display. Current trends of the mobile or hand-held devices focus on thinner devices. The embodiments described below are not limited to implementations which solve any or all of the disadvantages of known displays with integrated touch function.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A display with integrated directional self-capacitance sensors comprises a sensor electrode and a guard layer in the display stack. Touch displays with integrated touch function combine internally elements required for the display function and the touch sensing function. In an embodiment the common voltage layer, VCOM layer, is used as the guard layer and another layer on top of the common voltage layer, for example a color filter layer, is used for the electrode array layer. The functionality of the common voltage layer is alternated between the touch sensing function and the display function. Either function may be used while the other function is disabled.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples are described and illustrated herein as being implemented in a smart phone, the device described is provided as an example and not a limitation. As those skilled in the art will appreciate, the present examples are suitable for application in a variety of different types of mobile and/or hand-held apparatuses, e.g. in tablets and laptops.

Capacitive displays with a touch function may be divided into two different technologies: mutual capacitance and self-capacitance. The mutual one is based on sensing electrodes arranged in rows and columns. The object affects the mutual coupling between rows and columns, wherein the values may be measured by scanning each row and column and detecting capacitance changes between each intersection. Self-capacitance uses multiple individual sensors, also known as directional sensors, wherein the capacitance change is measured between the sensor and a common voltage level such as the ground level. The sensor arrangement of rows and columns may also be applied to the self-capacitance system. The object may be a finger or a stylus or anything suitable for generating a change in the charge between the sensor elements. Individual self-capacitance sensors may be connected to charge amplifiers or to multiplexing system that selects the connection between the sensor and the charge amplifier, enabling using one charge amplifier with more than one sensor. Charge amplifier converts the detected charge between the sensor elements to amplified signal, for example to the change in capacitance. The common voltage level of the self-capacitance system is often called a guard electrode. The common voltage level may for example a ground level, a device chassis voltage level, a phone chassis voltage level. The guard electrode provides a common drive or excitation voltage for the touch sensing system.

Figure 1:
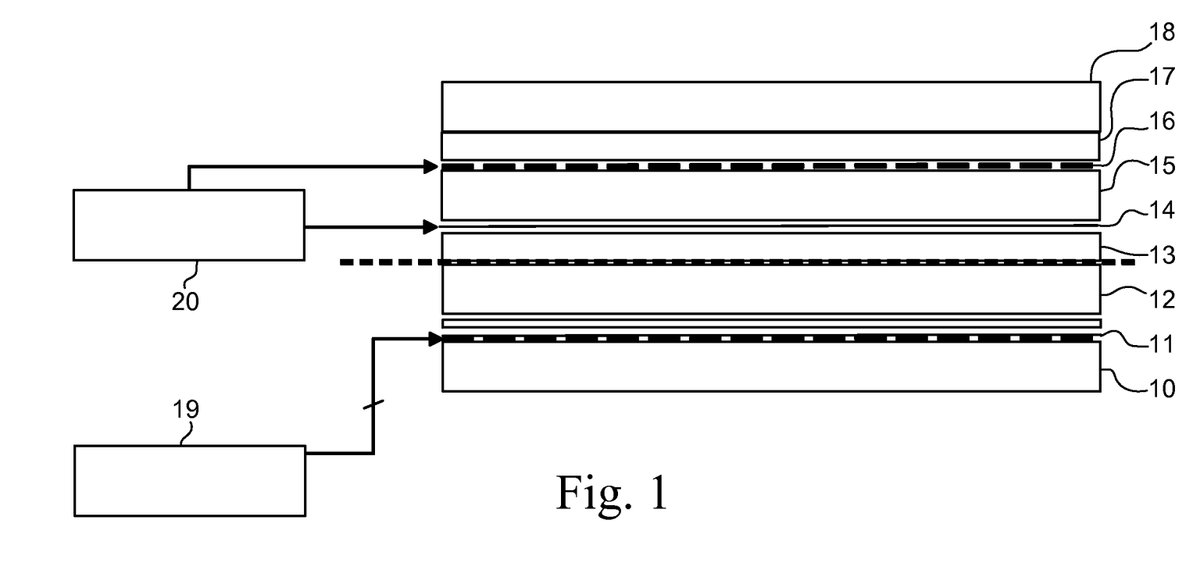
FIG. 1 is a schematic diagram of a display stack according to prior art.

The guard electrode may be a layer arranged in the display stack. The display stack comprises different layers required for the display function, and in touch displays the display stack comprises layers required for the touch function. FIG. 1 illustrates a schematic example of a display stack according to prior art with the control electronics. This example or any later example does not illustrate thicknesses of layers in specific proportions; the layer thickness may be modified according to a specific embodiment. In this context, directions such as "top", "higher" or "up" relate to the visible side of the display; and "bottom", "lower" or "down" relate to the side of the display that is attached to the device.

An array glass 10 forms the bottom layer of the display stack. The display panel 11 may be a LCD panel, LED, OLED, AMOLED panel or any means for presenting an image. The display driver 19 operates and controls the display panel 11. The display driver may be a separate integrated circuit connected to the display panel 11. On top of the display panel 11 there is a color filter 12 that may be made of glass. Display functions are arranged on the lower portion of the display stack and touch functions are arranged on the upper portion. An adhesive layer 13 connects the color filter 12 and the guard layer 14 used for sensing touch. In this arrangement a touch sensor substrate 15 separates the self-capacitance sensing layers, the lower guard layer 14 and the upper electrode layer 16. The electrode layer 16 may comprise multiple sensors on the same layer according to the desired touch sensing resolution. Electrodes may be arranged in an array and they may be square or any other shape in two dimensions on the electrode layer 16. A touch control 20 is connected to the guard layer 14 and the electrode layer 16. The touch control 20 may be a separate integrated circuit. A window 18 forms the top layer. It is connected to the electrode layer 16 and to the touch sensor substrate layer 15 with an adhesive layer 17. The window 18 may be made of glass or any other suitable transparent and durable material.

Figure 2:
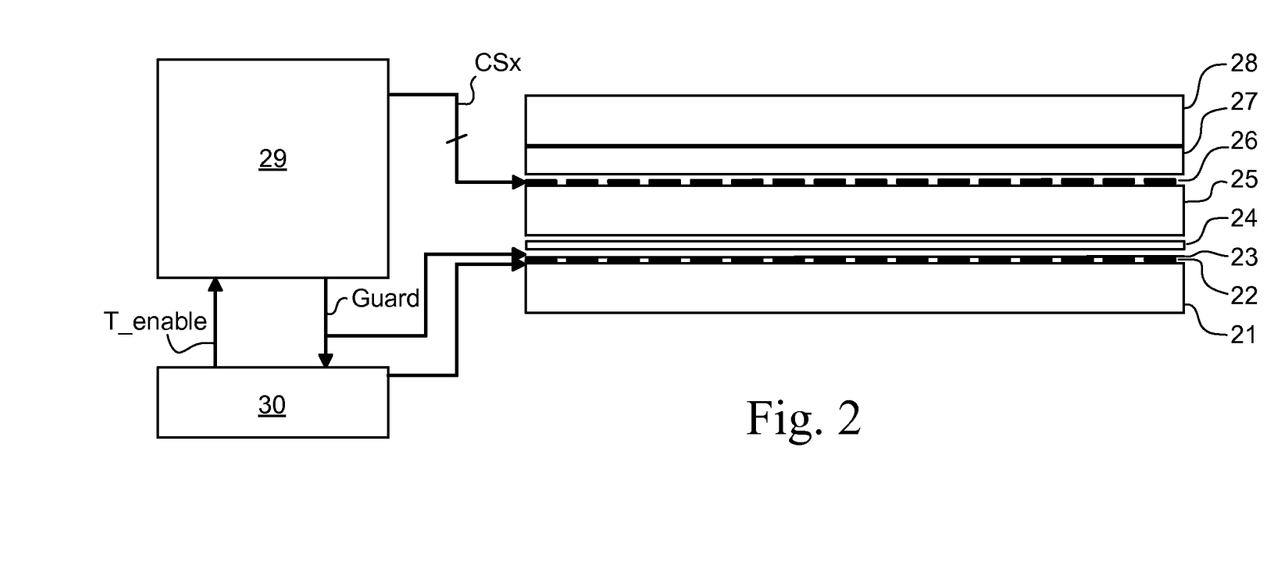
FIG. 2 is a schematic diagram of an embodiment of a display stack with a touch control module and a display driver module.

FIG. 2 shows an embodiment of a self-capacitive display, wherein the display functions and the touch sensing functions are integrated. An array glass 21 forms a base layer for the display structure. The electronic display comprises a common voltage layer 23 and an electrode array layer 26 arranged at a distance on top of the common voltage layer 23 on the display stack. The common voltage layer 23 and the electrode array layer 26 are in parallel with each other. The distance between the common voltage layer 23 and the electrode array layer 26 may be defined by the layers between the common voltage layer 23 and the electrode array layer 26—in this example the color filter layer 25 and the liquid crystal layer 24—wherein the electrode array layer 26 is arranged on top of the color filter layer 25. The effect of detecting capacitive changes from an external source such as touch may improve with a bigger distance between the common voltage layer 23 and the electrode array layer 26. The common voltage layer 23 comprises two functions, a VCOM layer for the display mode and a guard electrode layer for the touch sensing mode. An array of panel pixel layer 22 22, for example TFT pixels, is arranged on top of the array glass 21and under the common voltage layer 23. A liquid crystal layer 24 is arranged on top of the common voltage layer 23. On top of the electrode array layer 26 there is an adhesive layer 27 connecting the top window layer 28. In this example embodiment the electrode array layer 26 is arranged on top of a color filter layer 25. In one embodiment, the electrode array layer 26 is arranged between the adhesive layer 27 and the window layer 28. One embodiment according to FIG. 2 is a display integrated self-capacitive touch system. In one embodiment the display is an in-cell display.

In an embodiment, there is provided at least one processor and a memory storing instructions that, when executed, cause the display to alternate between the display addressing mode and the touch measurement mode wherein, in the touch measurement mode. The touch is detected by self-capacitance between the common voltage layer 23 and the electrode array layer 26. The display addressing refers to the function wherein pixels of the display are addressed to display an image—this may also be referred to as display updating. In this example a touch control module 29 controls touch sensing functions. The touch control module 29 is electrically connected with a connection CSx to the electrodes on the electrode array layer 26. The touch control module 29 is also electrically connected to the common voltage layer 23 or to the same voltage level, for example ground level or device chassis voltage level, wherein the common voltage layer 23 functions alternately as the guard layer. A display driver module 30 controls display functions and is connected to the common voltage layer 23.

In an embodiment, there is provided a display driver module 30 and a touch control module 29 connected to the display driver module 30, the display driver module 30 causing the touch control module 29 to measure the change in capacitance between the common voltage layer 23 and the electronic sensor array 26 in the touch measurement mode. The touch control module 29 receives a signal T_enable from the display driver module 30 via an electric connection. The display driver module 30 controls and sends the signal T_enable to the touch control module 29, enabling the touch control module 29 to start measuring self-capacitance, the change in capacitance that the capacitive charge induced between the common voltage layer 23, the guard layer 23 in this example, and the electrodes on the electrode array layer 26. The touch control module 29 sends a Guard signal to the display driver module 30.

In an embodiment, the display driver module 30 and a touch control module 29 connected to the display driver module 30 cause the display to alternate between the display addressing mode and the touch measurement mode. As the display alternates between the display addressing mode and the touch measurement, the touch control module 29 sends the Guard signal with a predefined amplitude and frequency.

In an embodiment, the display driver module 30 being connected to the common voltage layer 23 and the touch control module 29 connected to the electrode array layer 26 and to the display driver module 30, the display driver module 30 provides a DC signaling for the common voltage layer 23 in the display addressing mode and an AC signaling for the common voltage layer 23 in the touch measurement mode. The display driver module 30 drives the guard layer 23 as a response to the Guard signal and sets up the required DC offset for the common voltage/guard layer 23 and the array of panel pixel layer 22.

In an embodiment, a touch control element and/or the display control element cause the display to alternate between the display addressing mode and the touch measurement mode. The display driver module 30 and the touch control module 29 may be integrated into a single touch control element, for example into an integrated circuit capable of operating the touch function and the display function.

Figure 3:
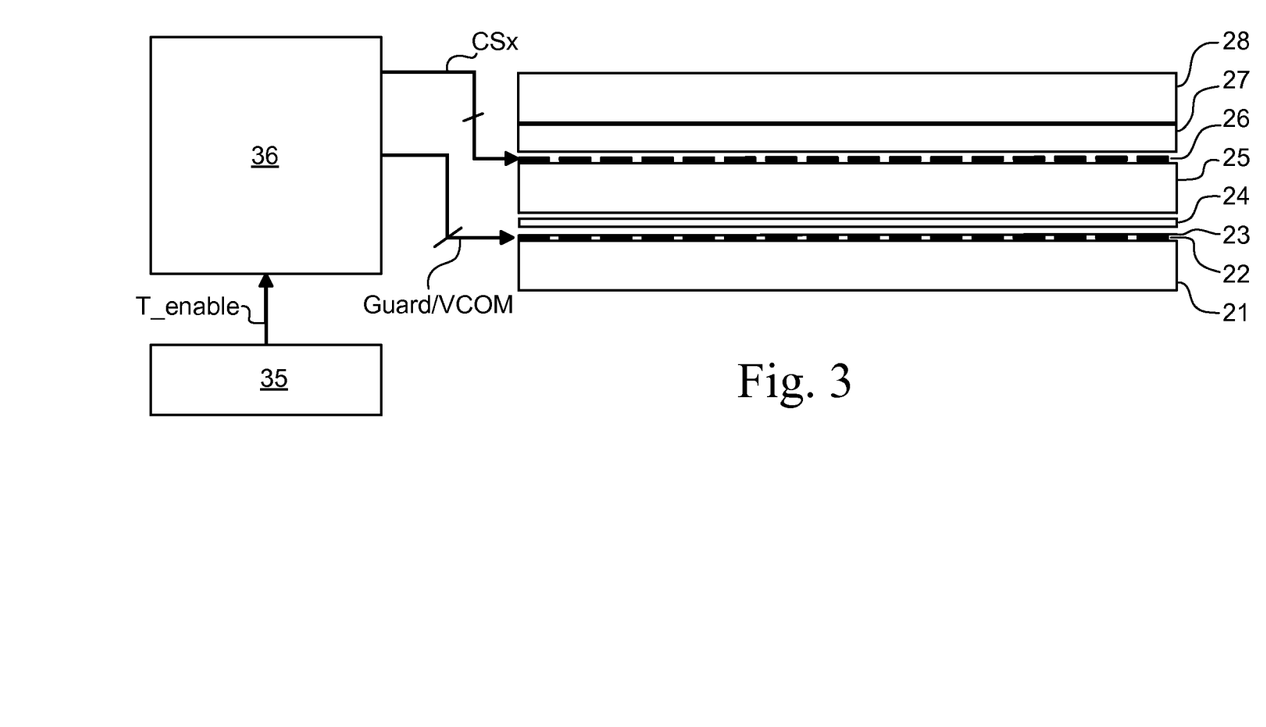
FIG. 3 is a schematic diagram of an embodiment of a display stack with a touch control module and a display driver module.

FIG. 3 shows an embodiment where the display stack is similar to the example illustrated in FIG. 2. A touch control module 36 is electrically connected to the electrodes of the electrode array layer 26 and receiving signal CSx. The touch control module 36 is also electrically connected to the common voltage layer 23 and the array of panel pixel layer 22, setting the required voltage offset for both layers 22, 23. A display driver module 35 is electrically connected to the touch control module 36, periodically sending the signal T_enable to the touch control module 36. In the embodiment the touch control module 36 is connected to the common voltage layer 23, to the array of panel pixel layer 22 and to the electrode array layer 26 and the display driver module 35 is connected to the touch control module 36, wherein the signal received from the display driver module 35 causes the touch control module 36 to drive the common voltage layer 23 in the touch measurement mode while maintaining the array of panel pixel layer 22 at a required voltage offset from the common voltage layer 23.The display driver module 35 controls the signal T_enable, enabling the touch control module 36 to start signal acquisition from the electrodes of the electrode array layer 26. The touch control module 36 controls the guard layer 23, which is the same layer as the common voltage layer 23. In an embodiment, the touch control module 36 is connected to the common voltage layer 23 and to the electrode array layer 26; and a display driver module is connected to the touch control module; and the touch control module 36 provides the required AC and DC signalinga direct current offset for the common voltage layer 23 in the display addressing mode and the touch measurement mode. The touch control module 36 sets up the required DC offset in the touch measurement mode and in the display addressing mode for the common voltage layer 23 and the the array of panel pixel layer 22.

Figure 4:
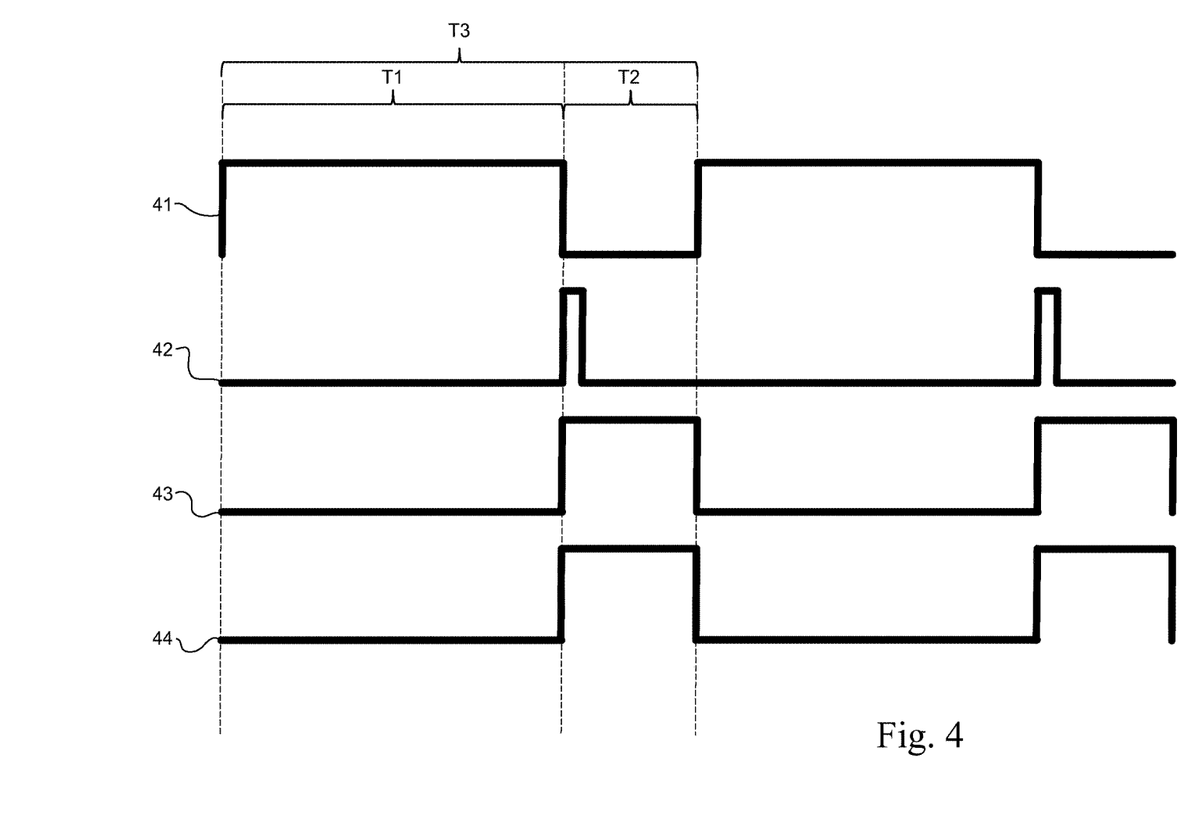
FIG. 4 is an example of a timing diagram.

FIG. 4 illustrates a schematic timing diagram of an example of display quiet time used for touch measurement. The x-axis represents time, wherein T1 is the display addressing active time; T2 is the touch measurement active time; and T3 is the display frame combining both T1 and T2. Timing cycle 41 is a display addressing cycle; timing cycle 42 is a touch enable signal, for example the signal T_enable according to previous examples; timing cycle 43 is a common voltage layer, VCOM or guard layer cycle; and timing cycle 44 is a touch measurement cycle. In this example the display frame rate usually is 16 ms; however, the display driver module can update the display panel faster, leaving quiet time for touch measurement. The quiet time is indicated by the synchronization signal T_enable sent for example from the display driver module to the touch control module. After receiving the T_enable signal, the touch control module starts measuring the electrodes in the electrode array layer for a pre-defined time. The common voltage layer VCOM is alternating as the guard layer; the signal T_enable allows reusing of the common voltage layer VCOM for the display as an AC driven guard layer for the touch measurement. The guard signal is sent from the touch control module to the display driver module to adjust the array of panel pixel layer 22 DC-offset correctly or as in another embodiment—the touch control module may the array of panel pixel layer 22 DC offset. The touch control module measures the touch or proximity of an object capable of changing the charge of the self-capacitive electrode. In the display addressing mode the touch control module gives control of the common voltage layer VCOM and the array of panel pixel layer 22 to the display driver module to set up proper voltage levels, or as in another embodiment—the touch control module may set up proper voltage levels.

Figure 5:
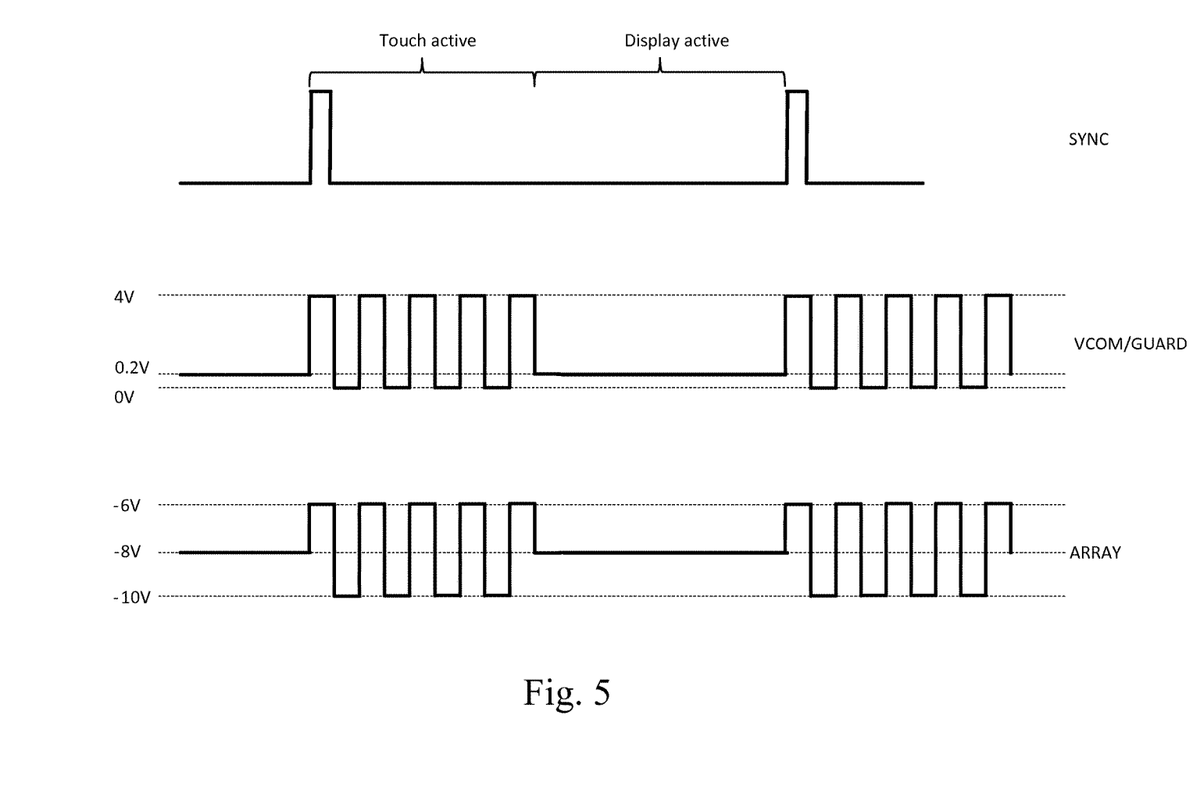
FIG. 5 is an example of voltage levels during different modes.

FIG. 5 illustrates one example of voltage levels of different signals as a function of time. The x-axis is split into portions, first starting from the touch measurement mode. The signal SYNC indicates the synchronization signal for the touch control module and the display driver module, enabling both elements to start the cycle simultaneously. The signal VCOM/GUARD indicates the voltage level applied to the common voltage layer. In the touch measurement mode the VCOM/GUARD signal is alternating between a 0V and 4V square wave, applying the AC excitation voltage to the layer functioning as a guard layer in the touch measurement mode. The array of panel pixels follows the same square waveform, with voltages alternating between −10V and −6V. In the display addressing mode the VCOM/GUARD signal is set to 0.2V, wherein the layer is used as a common voltage layer. The array of panel pixels is set to −8V, wherein the fixed voltage level does not interfere with the display function. The display is not active during the touch mode, and the touch measurement is not active in the display mode.

The solution enables reusing of the display VCOM layer as the guard layer. The color filter layer is also used for the sensor electrodes layer; also other layers providing a distance to the common voltage layer may be used. The solution may control the display driver module and touch control module when integrating touch measurement into the display cycle. The touch enable signal T_enable may be generated for the display driver module and/or the touch control module. The solution may control VCOM and electrode sensor array layer AC and DC levels, while alternately doing touch measurement and updating/addressing the display image.

Figure 6:
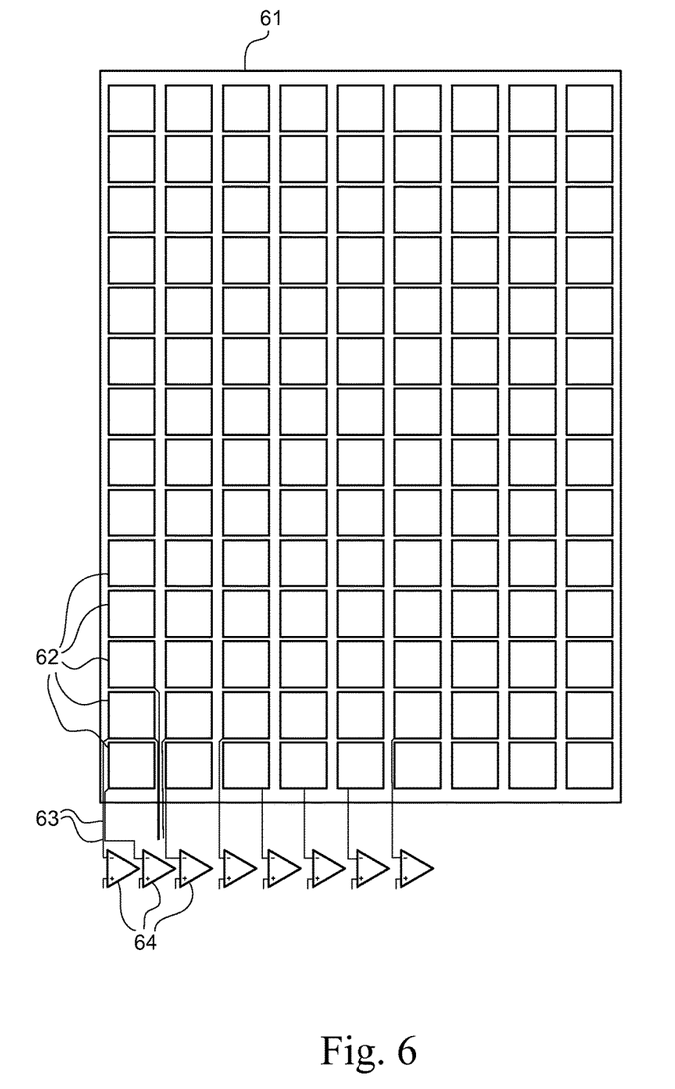
FIG. 6 is a schematic diagram of the electrode array layer.

FIG. 6 shows schematically the common voltage layer 61 being actively driven as the guard layer. Sensor electrodes 62 are arranged in another layer at a distance from the common voltage layer 61. Sensor electrodes 62 may be arranged in different shapes or sizes, but in this example the electrodes 62 are square. Connections 63 illustrate the routing from the sensor electrodes 62 to the charge amplifiers 64, wherein the system may comprise one charge amplifier 64 per sensor electrode 62 or a multiplexing system in order to reduce the amount of charge amplifiers and the following elements in the signal path up to the AD converters. Charge amplifiers 64 are illustrated only as an example of the elements providing the signal path from analog sensor information to digital data. The touch resolution increases with the number of sensor electrodes 62; for example, a smart phone display may comprise over hundred sensor electrodes 62. Charge amplifiers 64 and the following elements in the signal path up to AD converters may be integrated into the touch control module or they may be a separate component, an integrated circuit comprising multiple charge amplifiers and providing the electrical connection between the touch control module and the sensor electrodes.

In an embodiment, a display structure comprises a display stack, a common voltage layer on the display stack and an electrode array layer on the display stack; the electrode array layer arranged at a distance on top of the common voltage layer on the display stack, wherein the electrode array senses touch by self-capacitance; a touch control element coupled to the common voltage layer and to the electrode array layer, wherein the touch control element causes the common voltage layer to alternate between the display addressing mode and the touch measurement mode. In an embodiment, the touch control element comprises a display driver module and a touch control module connected to the display driver module causes the display to alternate between the display addressing mode and the touch measurement mode. In an embodiment, the touch control element comprises a display driver module and a touch control module connected to the display driver module, wherein the display driver module causes the touch control module to measure the change in capacitance between the common voltage layer and the electronic sensor array in the touch measurement mode. In an embodiment, the touch control element comprises a display driver module connected to the common voltage layer and a touch control module connected to the electrode array layer and to the display driver module, wherein the display driver module provides a DC signaling for the common voltage layer in the display addressing mode and an AC signaling for the common voltage layer in the touch measurement mode. In an embodiment, the touch control element comprises a touch control module connected to the common voltage layer and to the electrode array layer; and a display driver module connected to the touch control module, wherein the signal received from the display driver module causes the touch control module to drive the common voltage layer in the touch measurement mode. In an embodiment, the touch control element comprises a touch control module connected to the common voltage layer and to the electrode array layer; and a display driver module connected to the touch control module, wherein the touch control module provides a DC signaling for the common voltage layer in the display addressing mode and an AC signaling for the common voltage layer in the touch measurement mode. In an embodiment, the electrode array layer is arranged on top of a color filter layer. In an embodiment, the electrode array layer is arranged between the adhesive layer and the window layer.

An embodiment of a method for a display comprises a display stack, a common voltage layer on the display stack and an electrode array layer on the display stack; setting the display for a display addressing mode by driving the common voltage layer to a predefined voltage level; setting the display for a touch measurement mode by driving the common voltage layer to drive a touch input and setting the display for a quiet period; and detecting the touch by self-capacitance between the common voltage layer and the electrode array layer arranged at a distance on top of the common voltage layer on the display stack. In an embodiment, the electrode array layer is arranged on top of a color filter layer. In an embodiment, the electrode array layer is arranged between the adhesive layer and the window layer. In an embodiment the method comprises alternating the display between the display addressing mode and the touch measurement mode. In an embodiment of the method the display comprises a display driver module and a touch control module connected to the display driver module, wherein the display driver module causes the touch control module to measure the change in capacitance between the common voltage layer and the electronic sensor array in the touch measurement mode. In an embodiment of the method the display comprises a display driver module connected to the common voltage layer and a touch control module connected to the electrode array layer and to the display driver module, wherein the display driver module provides a DC signaling for the common voltage layer in the display addressing mode and an AC signaling for the common voltage layer in the touch measurement mode. In an embodiment of the method the display comprises a touch control module connected to the common voltage layer and to the electrode array layer; and a display driver module connected to the touch control module, wherein the signal received from the display driver module causes the touch control module to drive the common voltage layer in the touch measurement mode. In an embodiment of the method the display comprises a touch control module connected to the common voltage layer and to the electrode array layer; and a display driver module connected to the touch control module, wherein the touch control module provides a DC signaling for the common voltage layer in the display addressing mode and an AC signaling for the common voltage layer in the touch measurement mode.

In an embodiment an electronic display comprises a common voltage layer; an electrode array layer arranged at a distance on top of the common voltage layer on the display stack; means for alternating the display between the display addressing mode and the touch measurement mode wherein in the touch measurement mode the touch is detected by self-capacitance between the common voltage layer and the electrode array layer. In an embodiment an electronic display comprises a touch control element that causes the display to alternate between the display addressing mode and the touch measurement mode. In an embodiment an electronic display comprises a display driver module and a touch control module connected to the display driver module causes the display to alternate between the display addressing mode and the touch measurement mode. In an embodiment an electronic display comprises a display driver module and a touch control module connected to the display driver module, wherein the display driver module causes the touch control module to measure the change in capacitance between the common voltage layer and the electronic sensor array in the touch measurement mode. In an embodiment an electronic display comprises a display driver module connected to the common voltage layer and a touch control module connected to the electrode array layer and to the display driver module, wherein the display driver module provides a DC signaling for the common voltage layer in the display addressing mode and an AC signaling for the common voltage layer in the touch measurement mode. In an embodiment an electronic display comprises a touch control module connected to the common voltage layer and to the electrode array layer; and a display driver module connected to the touch control module, wherein the signal received from the display driver module causes the touch control module to drive the common voltage layer in the touch measurement mode. In an embodiment an electronic display comprises a touch control module connected to the common voltage layer and to the electrode array layer; and a display driver module connected to the touch control module, wherein the touch control module provides a DC signaling for the common voltage layer in the display addressing mode and an AC signaling for the common voltage layer in the touch measurement mode. In an embodiment the electrode array layer is arranged on top of a color filter layer. In an embodiment the electrode array layer is arranged between the adhesive layer and the window layer.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the reflection control element functionality may be performed by one or more hardware logic components.

An example of the apparatus or a system described hereinbefore is a computing-based device comprising one or more processors which may be microprocessors, controllers or any other suitable type of processors for processing computer executable instructions to control the operation of the device in order to control one or more sensors, receive sensor data and use the sensor data. Platform software comprising an operating system or any other suitable platform software may be provided at the computing-based device to enable application software to be executed on the device.

The computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing-based device it will be appreciated that the storage may be distributed or located remotely and accessed via a network or other communication link, for example by using communication interface.

The computing-based device may comprise an input/output controller arranged to output display information to a display device which may be separate from or integral to the computing-based device. The display information may provide a graphical user interface, for example, to display hand gestures tracked by the device using the sensor input or for other display purposes. The input/output controller is also arranged to receive and process input from one or more devices, such as a user input device (e.g. a mouse, keyboard, camera, microphone or other sensor). In some examples the user input device may detect voice input, user gestures or other user actions and may provide a natural user interface (NUI). This user input may be used to configure the device for a particular user. In an embodiment the display device may also act as the user input device if it is a touch sensitive display device. The input/output controller may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method for operating a display stack comprising, comprising:
    providing a display stack comprising a single common voltage layer and an electrode array layer, the single common voltage layer being configured to operate as both: (1) a common voltage layer with a first voltage to operate the display stack in a display addressing mode, and (2) a guard layer with a second voltage to operate the display stack in a touch measurement; and
    providing a single voltage synchronization signal to a touch control module, the single voltage synchronization signal configured for operating as the common voltage layer during the display addressing mode and the guard layer during the touch measurement mode,
    wherein the single voltage synchronization signal causes switching of the voltage signal driving the common voltage layer from the first voltage to the second voltage.

2. A method according to claim 1, wherein the electrode array layer is arranged on top of a color filter layer.

3. A method according to claim 1, wherein the electrode array layer is arranged between the adhesive layer and the window layer.

4. An electronic display comprising:
    a single common voltage layer in a display stack, the single common voltage layer configured to provide a fixed voltage to operate as both: (1) a common voltage layer with a fixed voltage to operate a display stack in a display addressing mode, and (2) a guard layer with an oscillating voltage to operate the display stack in a touch measurement mode;
    an electrode array layer arranged at a distance on top of the single common voltage layer of the display stack;
    at least one processor and a memory storing instructions executable to generate a single synchronization signal configured to cause the single common voltage layer to cycle between operating as the common voltage layer during the display addressing mode and the guard layer during the touch measurement mode.

5. An electronic display according to claim 4, wherein a touch control element causes the display to alternate between the display addressing mode and the touch measurement mode.

6. An electronic display according to claim 4, wherein a display driver module and a touch control module connected to the display driver module cause the display to alternate between the display addressing mode and the touch measurement mode.

7. An electronic display according to claim 4, comprising a display driver module and a touch control module connected to the display driver module, wherein the display driver module causes the touch control module to measure the change in capacitance between the common voltage layer and the electronic sensor array in the touch measurement mode.

8. An electronic display according to claim 4, comprising a display driver module connected to the single common voltage layer and a touch control module connected to the electrode array layer and to the display driver module, wherein the display driver module provides a DC signaling for the common voltage layer in the display addressing mode and an AC signaling for the guard layer in the touch measurement mode.

9. An electronic display according to claim 4, comprising:
    a touch control module connected to the single common voltage layer and to the electrode array layer; and
    a display driver module connected to the touch control module, wherein the signal received from the display driver module causes the touch control module to drive the guard layer in the touch measurement mode.

10. An electronic display according to claim 4, wherein the fixed voltage is a DC voltage configuring the common voltage layer for the display addressing mode and the oscillating voltage is an AC voltage configuring the guard layer for the touch measurement mode.

11. An electronic display according to claim 4, wherein the electrode array layer is arranged on top of a color filter layer.

12. An electronic display according to claim 4, wherein the electrode array layer is arranged between the adhesive layer and the window layer.

13. A display structure, comprising:
    a display stack comprising a single common voltage layer and an electrode array layer, the single common voltage layer being configured to operate as both: (1) a common voltage layer with a fixed voltage to operate the display stack in a display addressing mode and, (2) a guard layer with an oscillating voltage to operate the display stack in a touch measurement mode;
    the electrode array layer arranged at a distance on top of the single common voltage layer on the display stack; and
    a touch control element coupled to the single common voltage layer and to the electrode array layer, wherein the touch control element causes the single common voltage layer to cycle between operating as the common voltage layer during the display addressing mode and the guard layer during the touch measurement mode.

14. A display structure according to claim 13, wherein the touch control element comprises a display driver module and a touch control module connected to the display driver module causes the display to alternate between the display addressing mode and the touch measurement mode.

15. A display structure according to claim 13, wherein the touch control element comprises a display driver module and a touch control module connected to the display driver module, wherein the display driver module causes the touch control module to measure the change in capacitance between the common voltage layer and the electronic sensor array in the touch measurement mode.

16. A display structure according to claim 13, wherein the touch control element comprises a display driver module connected to the single common voltage layer and a touch control module connected to the electrode array layer and to the display driver module, wherein the display driver module provides DCsignaling for the common voltage layer in the display addressing mode and AC signaling for the guard layer in the touch measurement mode.

17. A display structure according to claim 13, wherein the touch control element comprises a touch control module connected to the single common voltage layer and to the electrode array layer; and a display driver module connected to the touch control module, wherein the signal received from the display driver module causes the touch control module to drive the guard layer in the touch measurement mode.

18. A display structure according to claim 13, wherein the touch control element comprises a touch control module connected to the single common voltage layer and to the electrode array layer; and a display driver module connected to the touch control module, wherein the touch control module provides a DC signaling for the common voltage layer in the display addressing mode and an AC signaling for the guard layer in the touch measurement mode.

19. A display structure according to claim 13, wherein the electrode array layer is arranged on top of a color filter layer.

20. A display structure according to claim 13, wherein the electrode array layer is arranged between the adhesive layer and the window layer.

* * * * *